(12) United States Patent
Simmons

(10) Patent No.: US 8,898,346 B1
(45) Date of Patent: Nov. 25, 2014

(54) METHOD AND SYSTEM FOR CONFIGURING NETWORK DEVICES

(71) Applicant: QLOGIC, Corporation, Aliso Viejo, CA (US)

(72) Inventor: Charles R. Simmons, Apex, NC (US)

(73) Assignee: QLOGIC, Corporation, Aliso Viejo, CA (US)

( * ) Notice: Subject to any disclaimer, the term of this patent is extended or adjusted under 35 U.S.C. 154(b) by 26 days.

(21) Appl. No.: 13/922,911

(22) Filed: Jun. 20, 2013

(51) Int. Cl.
*G06F 3/00* (2006.01)
*G06F 13/12* (2006.01)
*G06F 13/10* (2006.01)

(52) U.S. Cl.
CPC ...... *G06F 13/102* (2013.01); *G06F 2213/0008* (2013.01); *G06F 2213/0036* (2013.01)
USPC ................................................ 710/8; 710/62

(58) Field of Classification Search
None
See application file for complete search history.

(56) References Cited

U.S. PATENT DOCUMENTS

| 7,853,741 | B2* | 12/2010 | Crespi et al. ................ 710/65 |
| 8,072,883 | B2* | 12/2011 | Dunbar ...................... 370/231 |
| 2011/0314141 | A1* | 12/2011 | Jibbe et al. ................ 709/224 |

* cited by examiner

*Primary Examiner* — Idriss N Alrobaye
*Assistant Examiner* — Richard B Franklin
(74) *Attorney, Agent, or Firm* — Klein, O'Neill & Singh, LLP

(57) ABSTRACT

Method and system for an initiator device communicating with a target device are provided. The initiator device sends an inquiry to the target device to determine if the target device supports dynamic parameter setting of certain operating parameters used by both the initiator device and the target device for sending and receiving information from each other. The initiator device receives parameters from the target device, when the target device supports dynamic parameter settings. The initiator device translates parameters received from the target device; and sets operating parameters at the initiator device based on the received parameters from the target device.

20 Claims, 6 Drawing Sheets

| Parameters that may be changed | Settings | Parameter Definition |
|---|---|---|
| Execution Throttle | 1-65535(65535) | A maximum number of SCSI commands sent by an adapter port to a target, before the adapter requires a response. |
| LUNs per Target | 0-8-16-32-64-128-256 | A maximum number of possible LUNs per the target device that the adapter will try to query if PLOGI (Port Login) response does not contain LUN availability data. |
| Enable Lip Reset | No/Yes | This setting indicates if an adapter can reset a bus during a LIP (Loop Initialization Primitive) |
| Enable LIP Full Login* | No/Yes | This setting allows the adapter to re-login to all ports after any LIP |
| Enable Target Reset | No/Yes | This setting indicates if an adapter can reset a Target device as a recovery mechanism. |
| Login Retry Count* | 0-255 (8) | Specifies the number of times the adapter firmware tries to log in to a device. |
| Port Down Retry Count* | 0-255 (30) | Specifies the number of seconds the adapter firmware retries a command to a port returning port down status. |
| Link Down Timeout* | 0-255 (0) | Specifies the number of seconds the adapter firmware waits for a Link that is down to recover before reporting it as down. |
| Interrupt Delay Timer* | 0-255 (0) | The value (e.g. in 100-microsecond increments) used by a timer to set the wait time between accessing (DMA) a set of handles and generating an interrupt. |
| Enable Interrupt | No/Yes | No= BIOS polls for cmd completion status<br>Yes = BIOS uses IRQ assigned to HBA |

FIG. 3-1

| Parameters that may be changed | Settings | Parameter Definition |
|---|---|---|
| Host Adapter BIOS | Disabled / Enabled | Parameter allows Boot from SAN |
| Frame Size | 512 / 1024 / 2048 | This option provides a Maximum Frame size value and may be negotiated by devices logging in. |
| Loop Reset Delay | 0-60 (5) | This is the delay before activity will start after a LIP or Loop Reset. |
| Fibre Channel Tape Support | Disabled / Enabled | This setting is for a tape storage device |
| Data Rate | Auto, N, N-1, N-2 (N= HBA speed) | This is the adapter communication speed. It can be set to auto negotiate or can be hard set to a specific speed. |

FIG. 3-2

| Ethernet Header 402 | FCOE Header 404 | SOF 406 | FC Header 408 | Pay Load 410 | FC CRC 412 | EOF 414 | Ethernet FCS 416 |

400

| Domain_ID 418 | Area_ID 420 | Port_ID 422 |
| Address Identifier 424 |||

| Word/Bits | FC Header 408 ||||
|---|---|---|---|---|
| | 31     24 | 23     16 | 15     08 | 07     00 |
| | R_CTL 408C | D_ID | | 408A |
| | CS_CTL 408K | S_ID | | 408B |
| | Type 408J | F_CTL | | 408D |
| | SEQ_ID 408E | DF_CTL 408L | SEQ_CNT | 408F |
| | OX_ID 408G | | RX_ID | 408H |
| | Parameter ||| 408M |

METHOD AND SYSTEM FOR CONFIGURING NETWORK DEVICES

TECHNICAL FIELD

The present disclosure relates to computing systems and devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others.

Initiators are used to send input/output (I/O) requests for storing or reading data at storage devices that are managed by a computing system, typically referred to as a target controller. An initiator may be an adapter coupled to a computing system that sends out I/O requests for reading or writing data. A target may be an adapter coupled to the target controller that provides a response to the I/O request. Various transport protocols, for example, Fibre Channel, Fibre Channel over Ethernet, iSCSI (Internet over Small Computer System Interface) and others may be used for sending I/O requests. For processing I/O requests, information is typically sent and received by network devices as frames or packets, depending on the protocol used.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Method and system for an initiator device communicating with a target device are provided. The initiator device sends an inquiry to the target device to determine if the target device supports dynamic parameter setting of certain operating parameters used by both the initiator device and the target device for sending and receiving information from each other. The initiator device receives parameters from the target device, when the target device supports dynamic parameter settings. The initiator device translates parameters received from the target device, and sets operating parameters at the initiator device based on the received parameters from the target device.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts:

FIGS. 3-1/3-2 show an example of various parameters that can be set using the process flow of FIG. 2.

DETAILED DESCRIPTION

Figure 1A:
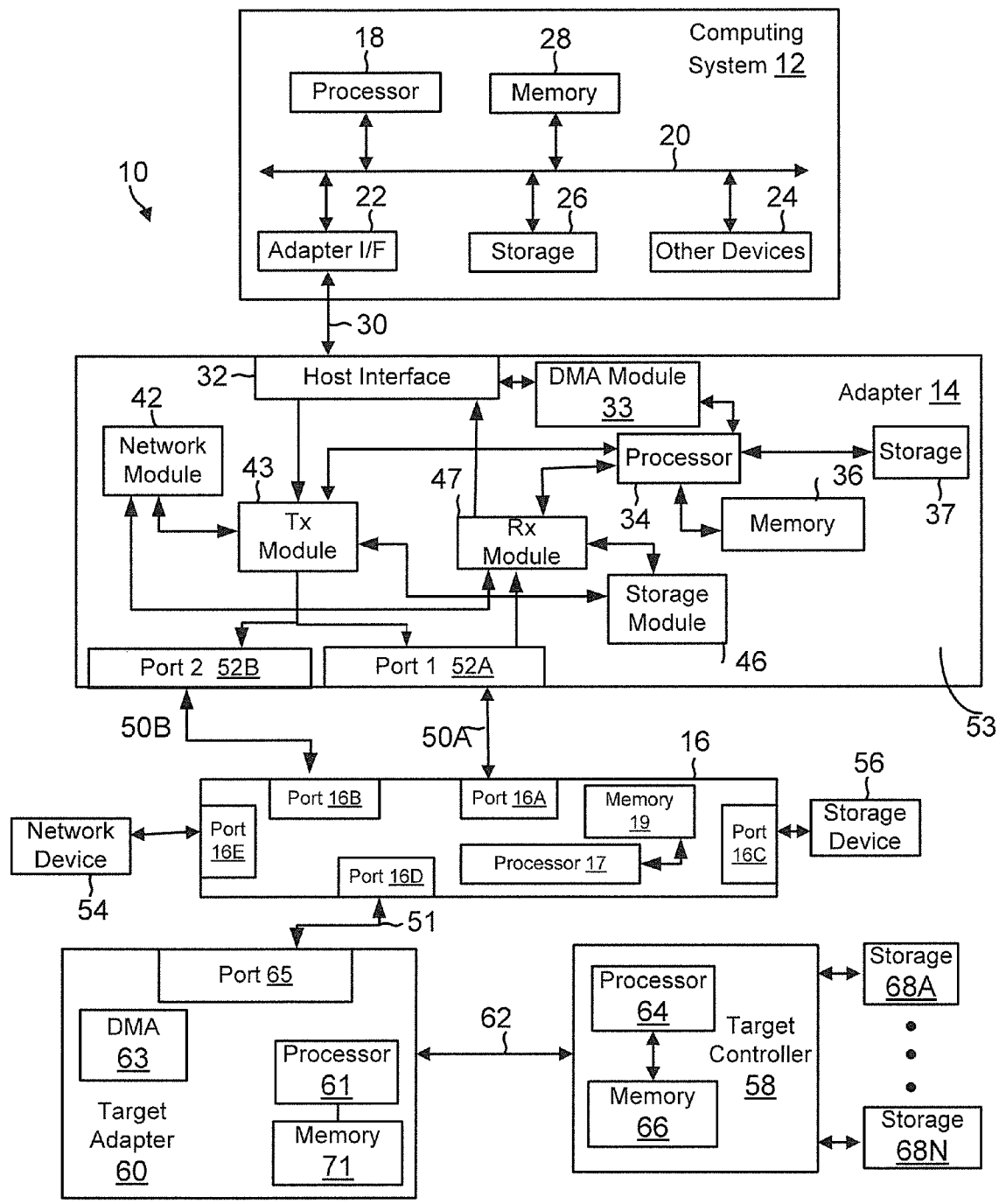
FIG. 1A is a system diagram showing components using the embodiments of the present disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system" and "functionality," as used herein, generally represent software, firmware, hardware, or a combination of these elements. For instance, in the case of a software implementation, the terms "logic", "module", "component", "system" and "functionality" represent program code that performs specified tasks when executed on a processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System 10: FIG. 1A is a block diagram of a system 10 configured for use with the present embodiments. The system 10 may include one or more computing system 12 (may also be referred to as "host system 12" or server 12) coupled to an adapter 14 (may also be referred to as initiator adapter 14) having a plurality of ports (52A/52B) that interface with a switching element 16. Switch element 16 may be a fabric switch having a plurality of ports 16A-16E. The term port as used herein means logic/circuitry that is used to receive and transmit information. A port may have both physical and logical elements that may be configured. A processor 17 of switch element (or switch) 16 executes firmware instructions out of memory 19 to control the overall operations of switch element 16. Switch 16 ports may be configured to operate as Fibre Channel ports, Ethernet ports, Fibre Channel over Ethernet (FCoE) ports or any other protocol type.

The computing system 12 may include one or more processors 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 may further include a local storage device 26, which may be for example a hard disk, a CD-ROM, a non-volatile memory device (flash or memory stick) or any other device. Storage 26 may store operating system program files, application program files, and other files. Some of these files are stored at storage 26 using an installation program. For example, the processor 18 may execute computer-executable process steps of an installation program so that the processor 18 can properly execute the application program. The computing system 12 also includes other devices and interfaces 24, which may include a display device interface, a keyboard interface, a pointing device interface and others.

The adapter 14 may be configured to handle both network and storage traffic. Various network and storage technologies may be used to handle network and storage traffic. Some common protocols and network technologies are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates between 100 Mbps and greater than a Gigabit per second. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage networking technology used to access storage systems is called Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_Port establishes a connection to a Fabric element (e.g., a switch) having a fabric port or F_Port.

Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14 or a converged network adapter. The illustrated adapter 14, however, does not limit the scope of the present embodiments. The present embodiments may be practiced with adapters having different configurations.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command data blocks (CDBs) to SCSI storage devices (may be referred to as targets) on remote servers. iSCSI is a SAN based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

Input/Output (I/O) operations to read data from a storage device and write data to the storage device are typically based on a client/server model. Typically, the client is a host computing system such as a file server that issues a read or a write command for a target using an adapter. The target may be a storage array that responds to the client request.

The following introduces some of the basic terms used during an I/O operation: (a) "Exchange" means the operations needed to perform a data read or write and is uniquely identified by an exchange identifier. An exchange typically includes three operational phases: command phase, data movement phase and response phase. (b) "Initiator"—Typically the client is the initiator that initiates a read or write command. (c) "Target"—Typically a storage array that accepts a read or write command, performs the requested operation.

In a typical I/O exchange, an initiator sends a "read" or "write" command to a target. For a read operation, the target sends the requested data to the initiator. For a write command, the target sends a "Ready to Transfer (XFER_RDY) Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete.

With continued reference to FIG. 1A, computing system 12 includes an adapter interface 22 that couples computing system 12 to the adapter 14 via a link 30. The adapter 14 interfaces with the computing system 12 via the link 30 and a host interface 32. In one embodiment, the host interface 32 may be a PCI Express interface coupled to a PCI Express link (for example, 30).

The adapter 14 may include a processor 34 that executes firmware instructions out of memory 36 to control overall adapter 14 operations. Direct memory access (DMA) module 33 may be used by adapter 14 to control access to link 30 for performing DMA operations, e.g. to send data to processor 18 or receive data from processor 18.

The adapter 14 may also include storage 37, which may be for example non-volatile memory, such as flash memory, or any other device. The storage 37 may store executable instructions and operating parameters that can be used for controlling adapter operations. Storage 37 may also be used to store operating parameters that may be dynamically changed, as described below in more detail.

The adapter 14 includes a network module 42 for handling network traffic via a link, for example, 50A/50B. In one embodiment, the network module 42 includes logic and circuitry for handling network packets, for example, Ethernet or any other type of network packets.

The adapter 14 may also include a storage module 46 for handling storage traffic to and from storage devices 56 and 68A-68N. In one embodiment, the storage module 46 is configured to process storage traffic according to the Fibre Channel storage protocol, or any other protocol, for example, iSCSI.

The adaptive embodiments of the present disclosure are not limited to adapter 14 having both and separate network and storage modules. For example, adapter 14 may have an integrated module that can handle either network and storage traffic, or adapter 14 may only have a storage module similar to a host bus adapter.

As mentioned above, adapter 14 includes a plurality of ports, for example, 52A and 52B that interface with links 50A and 50B, respectively. Ports 52A/52B include logic and circuitry to send and receive information (may be referred to as packets or frames) via the network 16. It is noteworthy that the embodiments disclosed herein are not limited to any particular number of ports.

In one embodiment, adapter 14 includes a transmit (Tx) module 43 for transmitting information from adapter 14 to other devices via link 50A/50B. The transmit module 43 may be used by the network module 42 and/or storage module 46. In another embodiment, the storage and network module may have dedicated transmit modules. It is noteworthy that the transmit module 43 may be included in each port 52A/52B.

The adapter 14 also includes a receive (Rx) module 47 for receiving and processing frames that are received via network link 50A/50B. The frames may be received complying with the Fibre Channel protocol, FCoE protocol or any other protocol type that is supported by adapter 14. It is noteworthy that the receive module 47 may be included in each port 52A/52B.

Adapter 14 may operate as an "initiator" for sending out I/O requests to a target controller 58 via a target adapter 60. The target adapter 60 is similar to the initiator adapter 14 and includes a processor 61 that has access to memory 71 that may be used to store firmware instructions or any other instruction. Target adapter 60 is coupled to switch 16 via a port 65 and link 51 similar to links 50A/50B. Target adapter 60 is coupled to the target controller 58 via a link 62 similar to link 30 described above. Target adapter 60 also includes a DMA module 63 that manages access to link 62 to send and receive data using DMA transfer operations.

Target controller 58 may be a computing system similar to computing system 12 having a processor 64 and a memory 66. Target controller 58 manages storage devices 68A-68N for reading and writing data for I/O requests from computing system 12 sent via the initiator adapter 12.

Figure 1B:
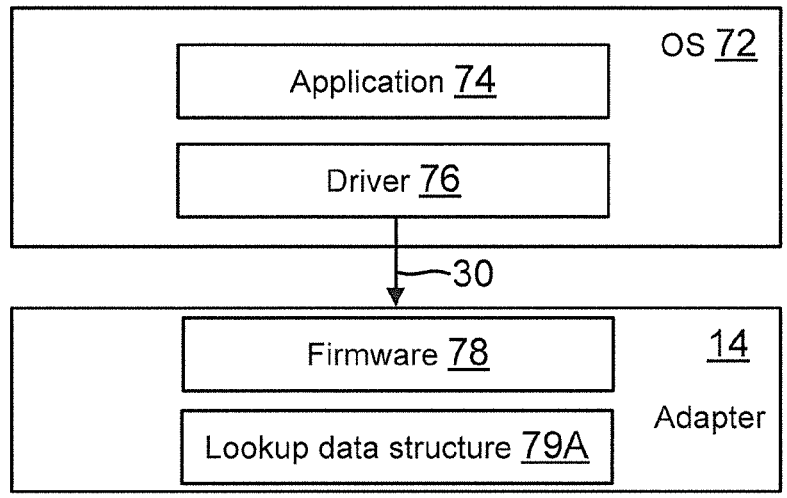
FIG. 1B is a block diagram showing the architecture used by an initiator system, used according to one embodiment.

FIG. 1B shows a block diagram of an architecture that may be used by or with the initiator components of system 10. For example, the architecture of FIG. 1B includes an operating system (OS) 72 that controls the overall operation of computing system 12. OS 72 may be Windows based, Linux based, Solaris based or any other OS type.

Application 74, when executed by computing system 12, may be a client application, for example, a database application, web server, e-mail application, and others. Application 74 may be used to generate a request to read and write information at storage devices 68A-68N (FIG. 1A).

Application 74 may also be a management application executed by a computing system used as a management console (not shown) for managing the various components in system 10. In one embodiment, application 74 may be used to configure a storage space at storage devices 68A-68N as a logical entity (logical unit number (LUN). Each LUN is uniquely identified by an identifier (LUN ID) and is associated with physical storage space. A LUN is typically divided into logical block addresses (LBAs) that are used by an application to read and write data to storage locations. The LBAs are mapped with actual physical storage to read and write data. To generate an I/O request to read or write data at a storage location, initiator adapter 14 uses a LUN identifier and a LBA range.

To communicate with adapter 14, application 74 uses a driver 76. The driver may be referred to as an adapter driver. To control the operations of adapter 14, an adapter processor executes firmware instructions 78 out of adapter memory. In one embodiment, some of the process steps may be executed by firmware 78.

Adapter 14 maintains a lookup data structure 79A. The data structure stores translation values for translating parameters that are received from target adapter 60. Adapter 14 translates the parameters so that it can understand the various parameters and then dynamically change certain settings, as described below with respect to FIG. 2.

In one embodiment, adapter 14 may be configured to support dynamic parameter setting, as described below. This may be based on setting a configuration bit or value at a configuration data structure (not shown) at storage 37 and/or memory 36. A similar setting may be used to enable or disable the dynamic setting ability.

Figure 1C:
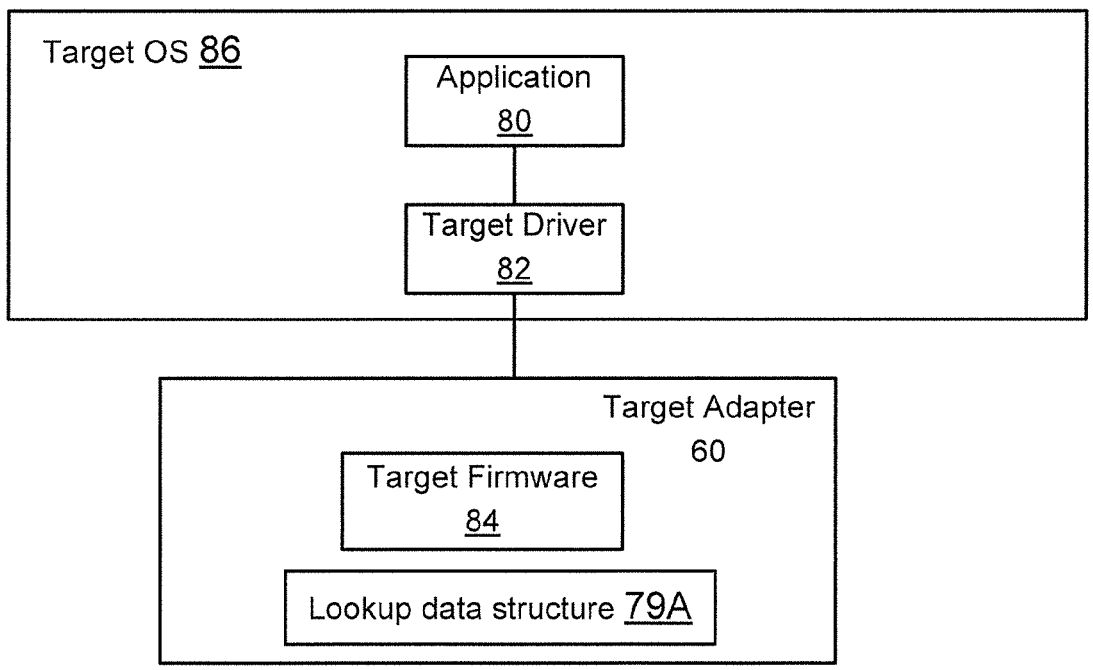
FIG. 1C is a block diagram showing the architecture used by a target system, used according to one embodiment.

FIG. 1C shows a block diagram of an architecture used by the target side of system 10 of FIG. 1A. For example, the architecture of FIG. 1C includes a target operating system 86 similar to OS 72 that controls the overall operation of target controller 58. OS 72 may be Windows based, Linux based, Solaris based or any other OS type. Target controller 58 may execute an application 80, similar to application 74 that is described above.

To communicate with target adapter 60, application 80 uses a target driver 82, similar to driver 76. To control the operations of target adapter 60, an adapter processor executes firmware instructions 84 (similar to firmware 78) out of target adapter memory. In one embodiment, some of the process steps may be executed by firmware 84. Target adapter 60 may also maintain a lookup data structure 79B similar to 79A that has been described above.

Figure 2:
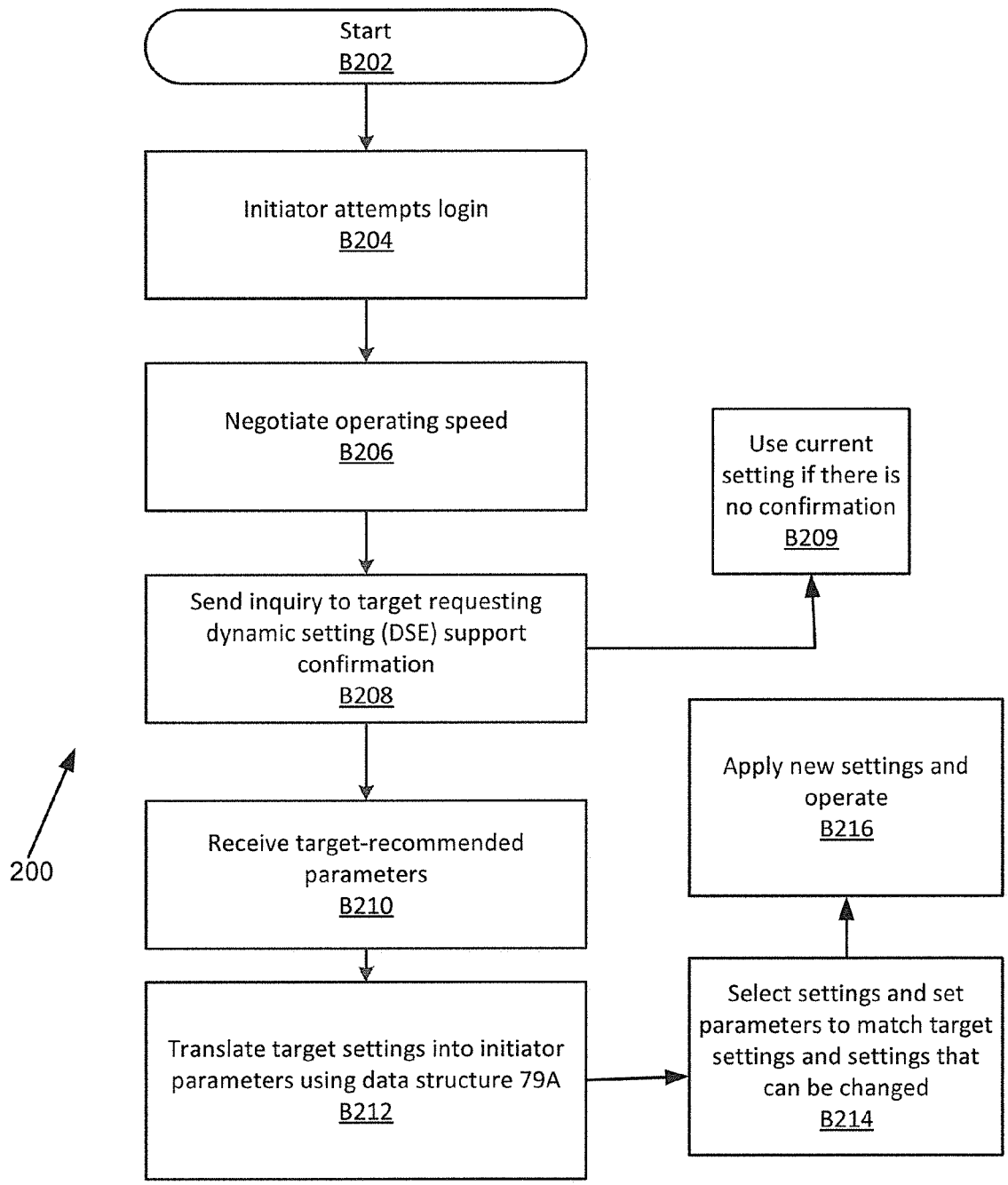
FIG. 2 shows a process flow diagram, according to one embodiment.

FIG. 2 shows a process 200, according to one embodiment. The process begins in block B202, when the various modules, for example, initiator adapter 14, switch 16, and target adapter 60, are all operational and functional. In block B204, the various ports, for example, ports 52A and 52B and port 65, negotiate the operational speed at which the ports will communicate. The negotiation process may be provided by a standard mechanism that may be provided by the protocol/standard used by the ports to communicate, for example, Ethernet, Fibre Channel and/or FCoE.

In block B208, initiator adapter 14 sends an inquiry to the target adapter 60 via switch 16 to determine if the port allows dynamic settings. The term dynamic settings means that certain operating parameters for the initiator and target can be changed. If a negative response or no response is received within a threshold duration, then the initiator adapter 14 simply uses the settings that are stored at the non-volatile storage 37.

If support is confirmed by the target adapter 60, then in block B210 settings recommended by target adapter 60 are received by the initiator adapter 14 (see Example below).

In block B212, the initiator adapter 14 references the look up data structure 79A to translate the received settings into corresponding initiator parameters. If multiple target adapters return parameters, then the initiator adapter 14 uses those settings that meet the minimum requirements of each target. Thereafter, in block B214 the initiator adapter 14 sets operating parameters based on the received settings. Only those parameters that can be dynamically modified are changed. In block B216, the new settings are applied, and the initiator adapter 14 operates under the new settings.

FIGS. 3-1/3-2 (jointly referred to as FIG. 3) show examples of the various settings that can be changed using the dynamic support settings process described above. As an example, one parameter that can be dynamically set is Execution Throttle, which is a maximum number of SCSI commands that can be sent by an adapter port before a response is required. LUNS per target is another parameter that can be set dynamically. LUNs per target denotes a maximum number of LUNs per target device that an adapter will try to query, if a port login response includes LUN availability. A port login is a login operation performed by a port so that it can communicate with another port. The process for the login may be defined by the protocol used by the port to communicate. For example, a Fibre Channel port uses PLOGI to login to another Fibre Channel port. Details of PLOGI are not germane to the embodiments disclosed herein.

Yet another parameter is the "Enable LIP Reset" setting that indicates if an adapter can reset a bus during a LIP operation. LIP in this context means loop initialization primitive. LIPs are transmitted in an arbitrated loop for initializing ports connected to the arbitrated loop. Details of LIP propagation are not germane to the embodiments disclosed herein.

Another parameter that can be set is "Enable LIP Full Login" that allows an adapter to re-login to all ports after a LIP propagation.

Other parameters that may be dynamically set include Enable Target Reset, Login Retry Count, Port Down Retry Count, Link Down Timeout, Interrupt Delay Timer, Enable Interrupt, Host Bus Adapter BIOS, Frame Size, Loop Reset Delay, Fibre Channel Tape Support, and Data Rate. These parameters are all described in FIG. 3.

The following provides an example of using the process flow of FIG. 2, according to one embodiment. Assume that after block B206, the initiator adapter initial settings are as follows:

| | |
|---|---|
| Execution Throttle | 65535 |
| Login Retry Count | 8 |
| Port Down Retry Count | 30 |
| Link Down Timeout | 0 |
| Data Rate | Auto |

The target may send recommend parameters as follows, in block 210:

A=100
B=4
C=20
D=0
Optional setting:
E=4G

The initiator looks up the data structure 79A to translate the target settings to as follows:

A=Execution Throttle
B=Login Retry Count
C=Port Down Retry Count
D=Link Down Timeout
Optional setting:
E=Data Rate Based on the target parameters and the translation in block B212, the initiator establishes new settings in block B214 as:

| | |
|---|---|
| Execution Throttle | 65535 |
| Login Retry Count | 4 |
| Port Down Retry Count | 20 |
| Link Down Timeout | 0 |
| Data Rate | 4 G |

It is noteworthy that the process of FIG. 2A is applicable to an initiator communicating with more than one target. In that situation multiple targets send their parameters. The initiator performs the translation in block B212 for each target and then establishes the initiator settings. The following shows the parameters that are sent by target adapter 1 and target adapter 2.

Target Adapter 1 Settings:
A=100
B=4
C=20
D=0
E=4G

Target Adapter 2 Settings:
A=150
B=6
C=30
D=0
E=Auto

The initiator determines the settings that meet the minimum requirements of both targets. Based on that, the initiator settings are established in block B216, as shown below:

| New Initiator Adapter Settings: | |
|---|---|
| Execution Throttle | 100 |
| Login Retry Count | 4 |
| Port Down Retry Count | 20 |
| Link Down Timeout | 0 |
| Data Rate | 4 G |

Figures 4A, 4B, 4C:
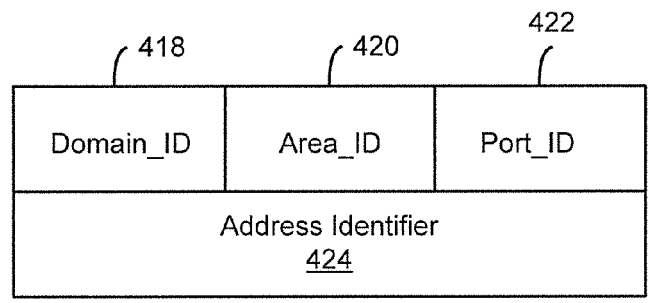
FIGS. 4A-4C show examples of frame formats that can be used with the present embodiments.

FIG. 4A shows an example of an FCoE frame (or packet, used interchangeably throughout this specification) format 400 for processing network and storage traffic, according to the present embodiments. The FCoE packet 400 includes an Ethernet header 402. In one embodiment, the Ethernet header 402, which includes the Ethernet type, may be fourteen bytes in length, for example. The Ethernet header may also include optional Tag fields (not shown). The FCoE packet 400 also includes an FCoE header 404 that includes a number of reserved fields. A start of frame (SOF) 406 indicates the beginning of the embedded Fibre Channel frame and may be one byte, for example.

The FCoE packet 400 may also include a Fibre Channel header (FC Header) 408 that may be 24 bytes long with a payload 410. The payload 410 is also referred to herein as the data for a frame. The Fibre Channel cyclic redundancy code (CRC) 512 may be 4 bytes and the Fibre Channel end of frame (EOF) 414 may be 1 byte in size. The EOF 414 indicates the end of the embedded Fibre Channel frame. The Ethernet FCS 416 is inserted after the Fibre Channel EOF 414. The EOF may be referred to herein as a trailer.

FIG. 4B shows a standard 24-bit Fibre Channel address identifier 424. The address identifier 424 includes a Domain_ID 418, an Area_ID 420, and a Port_ID 422. The Domain_ID 418 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 420 is an Area identifier based on the middle 8 bits of the 24-bit Fibre Channel address. The Area_ID 420 applies either to (a) one or more N_Ports within and attached to a Fibre Channel switch, or (b) to an Arbitrated Loop of NL_Ports attached to a single FL_Port.

The Port_ID 422 is the lower 8-bits of a Fibre Channel address. The Port_ID 422 applies to both (a) a single N_Port and virtualized N_Port within a Domain/Area and (b) the valid AL_PA of a single NL_Port or FL_Port on an Arbitrated Loop.

FIG. 4C shows an example of the FC header 408 of FIG. 4A. The following frame header fields that may be used in the present methods are:

D_ID 408A—A 24-bit Fibre Channel frame header field that contains the destination address for a frame.

S_ID 408B—A 24-bit Fibre Channel frame header field that contains the source address for a frame.

R_CTL 408C—A routing control flag in a Fibre Channel header.

F_CTL 408D—A frame control flag.

SEQ_ID 408E—Provides a sequence number for a frame of an exchange.

SEQ_CNT 408F—Provides the number of frames that have been transmitted in a sequence.

OX_ID 408G: This is an originator exchange identifier that is assigned by an initiator.

RX_ID 408H—This is an exchange identifier that is generated by a target.

CS_CTL 408J—This bit is used to provide quality of service.

Type 408K—This field is used to indicate a payload. For example, a value of 0x08 indicates a SCSI-FCP payload.

DF_CTL 408L—This is field is used to indicate presence of optional headers and their size.

Parameter 408M—This is typically used to provide a relative offset in a sequence.

It is noteworthy that although the embodiments described above are based on initiator and target adapters, the adaptive embodiments can be used by any network device, for example, a switch port or other similar devices.

Although the present disclosure has been described with reference to specific embodiments, these embodiments are illustrative only and not limiting. For example, although the description above has been described with respect to an adapter, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine-implemented method for an initiator device communicating with a target device, comprising:

the initiator device sending an inquiry to the target device to determine if the target device supports dynamic parameter setting of certain operating parameters used by both the initiator device and the target device for sending and receiving information between each other;

the initiator device receiving parameters from the target device, when the target device supports dynamic parameter setting;

the initiator device translating the parameters received from the target device; and setting operating parameters at the initiator device based on the received parameters from the target device.

2. The method of claim 1, wherein the initiator device is an adapter for processing input/output requests.

3. The method of claim 1, wherein the initiator device is a target adapter coupled to a target controller for processing input/output request.

4. The method of claim 1, wherein the initiator device maintains a data structure for translating the received parameters from the target device and translating them into a format that can be processed by the initiator device.

5. The method of claim 1, wherein the initiator device is a Fibre Channel over Ethernet adapter, an iSCSI or a Fibre Channel adapter.

6. The method of claim 1, wherein the target device is a Fibre Channel over Ethernet adapter, an iSCSI or a Fibre Channel adapter.

7. The method of claim 1, wherein the initiator device operates based on its own settings when the target device does not support dynamic parameter settings.

8. A system, comprising:

an initiator device configured to send an inquiry to a target device to determine if the target device supports dynamic parameter setting of certain operating parameters used by both the initiator device and the target device for sending and receiving information between each other; configured to receive parameters from the target device, when the target device supports dynamic parameter setting; configured to translate the parameters received from the target device; and configured to set operating parameters at the initiator device based on the received parameters from the target device.

9. The system of claim 8, wherein the initiator device is an adapter for processing input/output requests.

10. The system of claim 8, wherein the initiator device is a target adapter coupled to a target controller for processing input/output request.

11. The system of claim 8, wherein the initiator device maintains a data structure for translating the received parameters from the target device and translating them into a format that can be processed by the initiator device.

12. The system of claim 8, wherein the initiator device is a Fibre Channel over Ethernet adapter, an iSCSI or a Fibre Channel adapter.

13. The system of claim 8, wherein the target device is a Fibre Channel over Ethernet adapter, an iSCSI or a Fibre Channel adapter.

14. The system of claim 8, wherein the initiator device operates based on its own settings when the target device does not support dynamic parameter settings.

15. A machine-implemented for an initiator device communicating with a target device, comprising:

enabling the initiator device and the target device for dynamically setting operational parameters;

the initiator device sending an inquiry to the target device to determine if the target device supports dynamic parameter setting of certain operating parameters used by both the initiator device and the target device for sending and receiving information between each other;

the initiator device receiving parameters from the target device, when the target device supports dynamic parameter setting;

the initiator device translating the parameters received from the target device using a data structure stored at the initiator device; and setting operating parameters at the initiator device based on the received parameters from the target device.

16. The method of claim 15, wherein the initiator device is an adapter for processing input/output requests.

17. The method of claim 15, wherein the initiator device is a target adapter coupled to a target controller for processing input/output request.

18. The method of claim 15, wherein the initiator device is a Fibre Channel over Ethernet adapter, an iSCSI or a Fibre Channel adapter.

19. The method of claim 15, wherein the target device is a Fibre Channel over Ethernet adapter, an iSCSI or a Fibre Channel adapter.

20. The method of claim 15, wherein the initiator device operates based on its own settings when the target device does not support dynamic parameter settings.

* * * * *

UNITED STATES PATENT AND TRADEMARK OFFICE
CERTIFICATE OF CORRECTION

PATENT NO. : 8,898,346 B1  
APPLICATION NO. : 13/922911  
DATED : November 25, 2014  
INVENTOR(S) : Charles R. Simmons Page 1 of 1

It is certified that error appears in the above-identified patent and that said Letters Patent is hereby corrected as shown below:

In the Specification,

In column 2, line 28, delete "terms"logic"," and insert -- terms "logic", --, therefor.

In column 2, line 28-29, delete "and"functionality,"" and insert -- and "functionality," --, therefor.

In column 2, line 32, delete "terms"logic"," and insert -- terms "logic", --, therefor.

In column 2, line 32-33, delete "and"functionality"" and insert -- and "functionality" --, therefor.

In column 6, line 21, delete "(LUN)." and insert -- (LUN)). --, therefor.

In column 7, line 26, delete "showexamples" and insert -- show examples --, therefor.

In column 7, line 31, delete "LUNS" and insert -- LUNs --, therefor.

In column 8, line 25, delete "4 G" and insert -- 4G --, therefor.

In column 8, line 57, delete "4 G" and insert -- 4G --, therefor.

In the Claims,

In column 11, line 15, in claim 15, delete "for" and insert -- method for --, therefor.

Signed and Sealed this  
Fourteenth Day of April, 2015

Michelle K. Lee  
*Director of the United States Patent and Trademark Office*